(12) United States Patent
Wood (10) Patent No.: US 10,348,716 B2
(45) Date of Patent: *Jul. 9, 2019

(54) SEAMLESS AUTHENTICATION FOR AN APPLICATION DEVELOPMENT PLATFORM

(71) Applicant: FinancialForce.com, inc., San Francisco, CA (US)

(72) Inventor: Matthew D. Wood, Leeds (GB)

(73) Assignee: FinancialForce.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,451

(22) Filed: Jan. 12, 2018

(65) Prior Publication Data

US 2018/0139197 A1    May 17, 2018

Related U.S. Application Data

(63) Continuation of application No. 15/189,218, filed on Jun. 22, 2016, now Pat. No. 9,900,302.

(51) Int. Cl.
*H04L 29/06* (2006.01)
*G06F 8/30* (2018.01)
(Continued)

(52) U.S. Cl.
CPC .............. *H04L 63/08* (2013.01); *G06F 8/30* (2013.01); *G06F 21/44* (2013.01); *G06Q 50/01* (2013.01);
(Continued)

(58) Field of Classification Search
CPC ..... H04L 63/08; H04L 63/0815; H04L 67/42; H04L 63/166; H04L 67/02; G06Q 50/01; G06F 21/44; G06F 8/30
See application file for complete search history.

(56) References Cited

U.S. PATENT DOCUMENTS

8,438,654 B1 * 5/2013 von Eicken ............. G06F 21/53
                                                                         709/217
9,900,302 B2 * 2/2018 Wood ...................... H04L 63/08
(Continued)

*Primary Examiner* — Robert B Leung
*Assistant Examiner* — Thomas Ho
(74) *Attorney, Agent, or Firm* — Perkins Coie LLP; Michael A. Glenn (57) ABSTRACT

Various embodiments concern mechanisms for facilitating communication between network-accessible platforms for developing, hosting, or running hybrid applications that utilize resources hosted across multiple platforms. Hybrid applications cause messages or "calls" to be passed between the platforms that must be authenticated. For example, when a call is placed by a Heroku platform to a Force.com platform, the call must be authenticated for security purposes. If Heroku has not already been authenticated when the call is submitted, an authentication process is invoked. An event listener can be used to register details regarding the initial callout task, and then register or "fire" an event when the authentication process is successfully completed. Registration of the initial callout task completely separates the authentication process from the resource being invoked. Requests can be completed without requiring further user input using at least some of the details registered by the event listener.

13 Claims, 6 Drawing Sheets

(51) Int. Cl.
*H04L 29/08* (2006.01)
*G06F 21/44* (2013.01)
*G06Q 50/00* (2012.01)

(52) U.S. Cl.
CPC ........ *H04L 63/0815* (2013.01); *H04L 63/166* (2013.01); *H04L 67/02* (2013.01); *H04L 67/42* (2013.01)

(56) References Cited

U.S. PATENT DOCUMENTS

| | | | | |
|---|---|---|---|---|
| 2011/0307948 | A1* | 12/2011 | Ranjan | G06F 21/53 |
| | | | | 726/9 |
| 2013/0042115 | A1* | 2/2013 | Sweet | H04L 63/0428 |
| | | | | 713/176 |
| 2014/0282968 | A1* | 9/2014 | Aboughanaima | H04L 63/08 |
| | | | | 726/7 |
| 2015/0186929 | A1* | 7/2015 | Thies | G06Q 30/0246 |
| | | | | 705/14.45 |
| 2015/0293764 | A1* | 10/2015 | Visvanathan | G06F 8/36 |
| | | | | 717/102 |
| 2016/0173411 | A1* | 6/2016 | Son | H04L 47/822 |
| | | | | 709/226 |
| 2016/0294667 | A1* | 10/2016 | Prabhakar | H04L 43/14 |
| 2016/0301732 | A1* | 10/2016 | Moretto | H04L 43/50 |
| 2016/0378450 | A1* | 12/2016 | Fu | G06F 8/61 |
| | | | | 717/177 |
| 2017/0264619 | A1 | 9/2017 | Narayanaswamy et al. | |
| 2017/0272550 | A1* | 9/2017 | Rodriguez | H04L 41/046 |

* cited by examiner

501 Receive a request for a resource hosted by Force.com platform

502 Register details associated with the initial call

503 Determine whether the Force.com platform is a registered client

504 Invoke an authentication process responsive to determining the Force.com platform is not a registered client

505 Pass at least some of the details associated with the initial request through the authentication process

506 Cause an event to be registered when the authentication process is successfully completed

507 Responsive to registering the event, complete the initial request using the registered details

SEAMLESS AUTHENTICATION FOR AN APPLICATION DEVELOPMENT PLATFORM

CROSS-REFERENCE TO RELATED APPLICATIONS

This application is a continuation of U.S. patent application Ser. No. 15/189,218, filed on Jun. 22, 2016, which is incorporated by reference herein in its entirety.

RELATED FIELD

Various embodiments relate generally to techniques for facilitating communication between network-accessible platforms and, more specifically, to techniques for facilitating authentication of application development platforms.

BACKGROUND

Salesforce is a cloud computing company that offers various customer relationship management (CRM) products and social enterprise (e.g., social networking) solutions. Companies offering CRM services, such as Salesforce, can provide entities with an interface for case management and task management, as well as a system for automatically routing and escalating important events. The Salesforce platform also enables individual customers to track their own cases. In some instances, the Salesforce platform includes a social networking add-on application (also referred to as a "plug-in") that allows the Salesforce platform to read conversations on social networking websites, analyze emails, chat messages, search engine queries, etc.

Force.com® and Heroku®, meanwhile, are development platforms that can be used by developers to build and run applications entirely in the cloud. For example, Force.com applications could be hosted on the architecture of the Salesforce platform and are typically built using Apex, which is a proprietary Java-like programming language. However, some hybrid applications utilize resources (e.g., data or processes) hosted by multiple platforms. For instance, an application supported by the Heroku may request resources from Force.com (or vice versa). It is often desirable to link to external services and external sources of data when developing hybrid applications for the Salesforce platform.

SUMMARY

Systems and techniques are described herein for facilitating communication between network-accessible platforms for developing, hosting, and/or running hybrid applications that utilize resources (e.g., data or processes) hosted across multiple platforms. When building a hybrid application that spans multiple platforms, messages or "calls" are passed between the platforms that must be authenticated. For example, when a Hypertext Transfer Protocol (HTTP) request is submitted from a Heroku platform to a Force.com platform, the request must be authenticated for security purposes. If the platforms have not already authenticated one another, an authentication process is invoked.

Conventionally, an application executed by a user device (e.g., a mobile phone, tablet, or personal computer) would have to resubmit the request for a resource upon successful completion of the authentication process. Mechanisms are described herein that allow the original request to be completed without requiring further user interaction (i.e., without requesting the application resubmit the original request).

More specifically, the mechanisms make use of an event listener that registers the initial request (also referred to as a "callout task"), and then registers or "fires" an event when the authentication process is successfully completed. Registration of the initial request separates the authentication process from the process or data being invoked. Thus, the authentication flow has no knowledge of the resource being invoked.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Systems and techniques are described herein for facilitating communication between network-accessible platforms for developing, hosting, and/or running hybrid applications that utilize resources (e.g., data or processes) hosted across multiple platforms. Hybrid applications cause messages or "calls" to be passed between the platforms that must be authenticated for security purposes. If the platforms have not already authenticated one another, an authentication process is invoked.

Conventionally, an application executed by a user device (e.g., a mobile phone, tablet, or personal computer) would have to resubmit the request for a resource upon successful completion of the authentication process. Described herein are mechanisms that make use of an event listener that registers details regarding the initial request, and then registers or "fires" an event when the authentication process is successfully completed. Requests can be completed on behalf of the application without requiring further user input by resubmitting the request using at least some of the details registered by the event listener.

Certain network-accessible platforms (e.g., Heroku and Force.com) are mentioned herein for the purposes of illustration. Other network-accessible platforms could also be used to run an application or host resources required by the application. The application may be accessible via one or more of a web browser, mobile application, software program, or over-the-top (OTT) application. Accordingly, the application may be accessed using any appropriate network-accessible electronic device, such as a mobile phone, tablet, personal computer, game console (e.g., Sony PlayStation® or Microsoft Xbox®), music player (e.g., Apple iPod Touch®), wearable electronic device (e.g., a watch or fitness band), network-connected ("smart") device (e.g., television), virtual/augmented reality system (e.g., Oculus Rift® or Microsoft Hololens®), or some other electronic device.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there between, while not sharing any physical connection with one another. Additionally, the words "herein," "above," "below," and words of similar import shall refer to this specification as a whole and not to any particular portions of this specification. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted by using capitalization, italics, and/or quotation marks. The use of highlighting has no influence on the scope and meaning of a term; the scope and meaning of a term is the same, in the same context, whether or not it is highlighted. It will be appreciated that an element or feature can be described in more than one way.

Consequently, alternative language and synonyms may be used for some of the terms discussed herein, and special significance is not to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is intended to be illustrative only and is not intended to further limit the scope and meaning of the disclosure or of any exemplified term. Likewise, the disclosure is not limited to the various embodiments given in this specification.

System Overview

Figure 1:
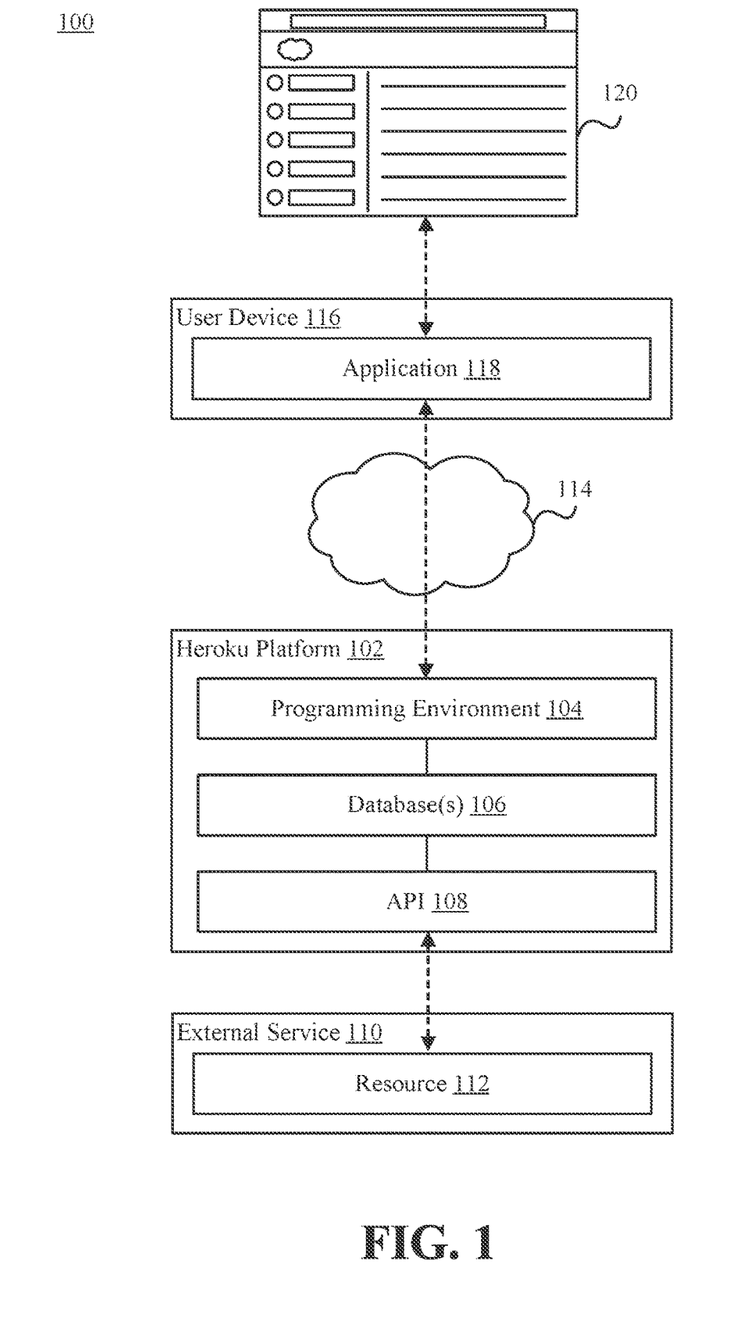
FIG. 1 depicts a high-level view of a network environment in which a Heroku platform facilitates execution of an application on a user device.

FIG. 1 depicts a high-level view of a network environment 100 in which a Heroku platform 102 facilitates execution of an application 118 on a user device 116. The Heroku platform 102 (which may also be referred to as a "Heroku environment") can include a programming environment 104 and an application programming interface (API) 108. Other components could also be included as part of the Heroku platform 102. For example, the Heroku platform 102 could also include one or more internal databases 106.

Together, these components are used to develop and support an application 118 that is executed by a user device 116, such as a mobile phone, tablet, or personal computer. When executed by the operating system of the user device 116, the application 118 generates an application interface 120 that a user can view and interact with (e.g., by providing user input).

Applications developed using the Heroku platform 102 may be hybrid applications that utilize resources (e.g., data or processes) hosted across multiple platforms. For example, the Heroku platform 102 could communicate with an external service 110 using the API 108 and request a resource 112 hosted by the external service 110. Hybrid applications cause messages or "calls" to be passed between the platforms and services that must be authenticated. The platforms/services can be connected to one another across one or more networks 114, such as the Internet, Bluetooth, a local area network (LAN), a wide area network (WAN), a point-to-point dial-up connection, etc.

Hybrid applications are able to make use of resources that are not stored locally by the Heroku platform 102. The API 108 (e.g., a Heroku Platform API) allows these resources to be programmatically automated, extended, and combined with services offered by the Heroku platform 102. Said another way, the API 108 seamlessly interfaces and integrates the Heroku platform 102 with the external service 110 (e.g., Force.com). The resources of the external service can then be made available to the Heroku platform 102. For example, data or processes could be used within the programming environment 104 of the Heroku platform 102.

The programming environment 104 is responsible for supporting the application 118 and can respond to user input received at the application interface 120 presented by the user device 116. The application interface 120 could be used for case management and task management, as well as for automatically routing and escalating important events. Alternatively, the application interface 120 could be used to track the status of individual cases or projects.

As further described below, the application interface 120 may support an additional functionality that is enabled by the external service 110 accessible to the Heroku platform 102. For example, a financial management application may allow a user (e.g., a company or a customer) to track and organize information that is retrieved from a Force.com platform. The information could be related to accounting, billing, professional services automation (PSA), revenue recognition, human capital management (HCM), supply chain management (SCM), etc.

Each hybrid application may also be described as a cloud-based solution that is developed for Heroku or Force.com. Each of these is considered a platform-as-a-service (PaaS) that allows developers to create multitenant applications that can be integrated into a Salesforce platform. Hybrid applications that make use of both Heroku and Force.com could be built using Apex (a proprietary Java-like programming language), Visualforce (a component-based user interface framework that includes a tag-based markup language similar to HTML), Ruby, Java, Node.js, Scala, Clojure, Python, PHP, Go, etc.

Figure 2:
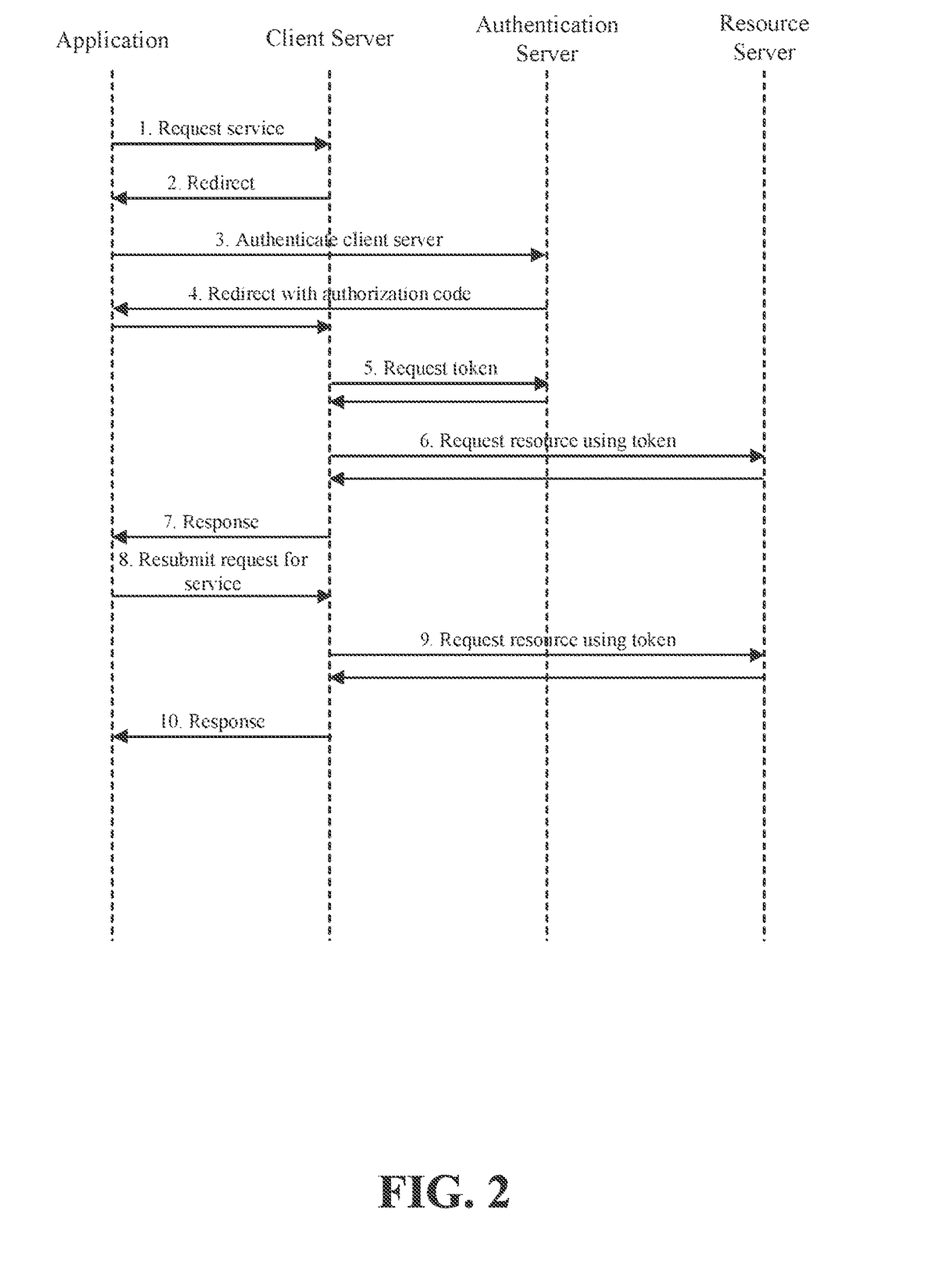
FIG. 2 depicts a flow diagram of a conventional authentication process that is used by an application executing on a user device to obtain access to a resource server.

FIG. 2 depicts a flow diagram of a conventional authentication process that is used by an application executing on a user device to obtain access to a resource server. More specifically, the application may submit a request for service to a client server that requires resource(s) hosted by the resource server. The resource server and client server could be associated with different services. For example, the client server could be associated with Heroku, while the resource server may be associated with Force.com.

When the client server determines that the request requires a resource (e.g., data or process) hosted by the resource server, an authentication process (also referred to as a "web server flow") is invoked. On successful completion of the authentication process, the client server may obtain an authentication token for the resource server from an authentication server. Here, for example, the client server (e.g., a Heroku platform) submits information to the authorization server to obtain access to the resource server (both of which form part of a Force.com platform).

The process begins with an application executed by a user device requesting a service from the client server. The client server responds by redirecting the application to an authentication server, which authenticates the client server. After the authentication server has successfully authenticated the client server, the application is redirected to the client server with a uniform resource locator (URL).

The client server can then extract an authorization code from the URL and send a request directly to the authorization server that includes the authorization code. The authentication server responds by providing an authentication token for the resource server and/or an address that can be used to submit requests directly to the resource server. For example, the address may be to an API that provides the client server with programmatic access to resources hosted by the resource server. At this point, the client server can use the authentication token and/or the address to authorize requests to access the resource server by the application.

However, the client server does not submit the original request to the resource server on behalf of the application. Instead, the client server notifies the application that the authentication process has been successfully completed, and the application resubmits the initial request for the service. Oftentimes, resubmittal requires that a user confirm the initial request or manually resubmit the request using the application interface. Once the request has been resubmitted, the client server requests the necessary resource(s) from the resource server using the authentication token and/or the address associated with the resource server. The resource server then responds to the request (e.g., by providing the requested data or performing the requested process), and the client server responds to the application.

Figure 3:
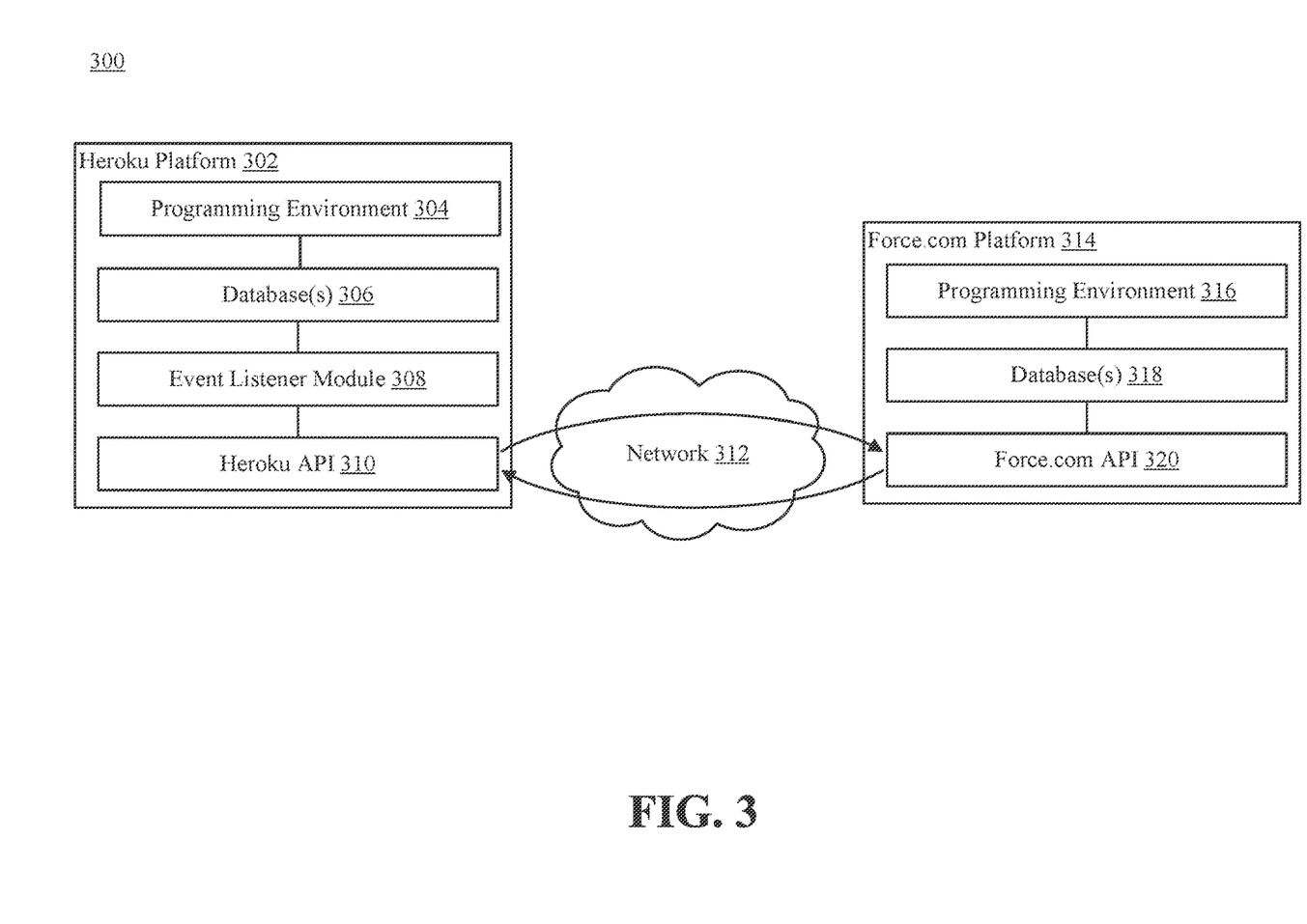
FIG. 3 depicts a network environment in which a Heroku platform communicates with a Force.com platform.

FIG. 3 depicts a network environment 300 in which a Heroku platform 302 communicates with a Force.com platform 314. The platforms may communicate with one another responsive to a hybrid application submitting a call (e.g., a HTTP request) to the Heroku platform 302 for a resource hosted by the Force.com platform 314.

The Heroku platform 302 can include a programming environment 304, an event listener module 308, and a Heroku API 108. The Heroku platform 302 could also include one or more databases 306 for hosting resources (e.g., data and processes). Similarly, the Force.com platform 314 can include a programming environment 316, one or more databases 318, and a Force.com API 320. Together, the Heroku API 310 and the Force.com API 320 can communicate directly with one another across a network 312, such as the Internet, Bluetooth, a local area network (LAN), a wide area network (WAN), a point-to-point dial-up connection, etc.

As noted above, a hybrid application that spans both platforms causes messages or "calls" to be passed between the Heroku platform 302 and the Force.com platform 314. However, calls passed between the platforms must be authenticated. For example, when a call is placed from the Heroku platform 302 to the Force.com platform 314 (e.g., in response to receiving an HTTP request for a service from an application), the call must be authenticated for security purposes. If the Heroku platform 302 has not previously been authenticated when the request is submitted, an authentication process is invoked. For example, the Force.com platform 314 may invoke the OAuth 2.0 web server authentication process.

An event listener module 308 is installed on the Heroku platform 302 that can completely separate the authentication process from the resource being requested by the hybrid application. Because the authentication flow has no knowledge of the resource being requested, the Heroku platform 302 can submit the initial request on behalf of the application without requiring further user input.

More specifically, the event listener module can register the initial callout task (e.g., by registering details of the initial callout task), and then register or "fire" an event when the authentication process has been successfully completed. The initial callout task can be resubmitted by the Heroku platform 302 on behalf of the application. More specifically, the Heroku platform 302 can pass task parameters to the Force.com platform 314 upon completion of the authentication process.

Figure 4:
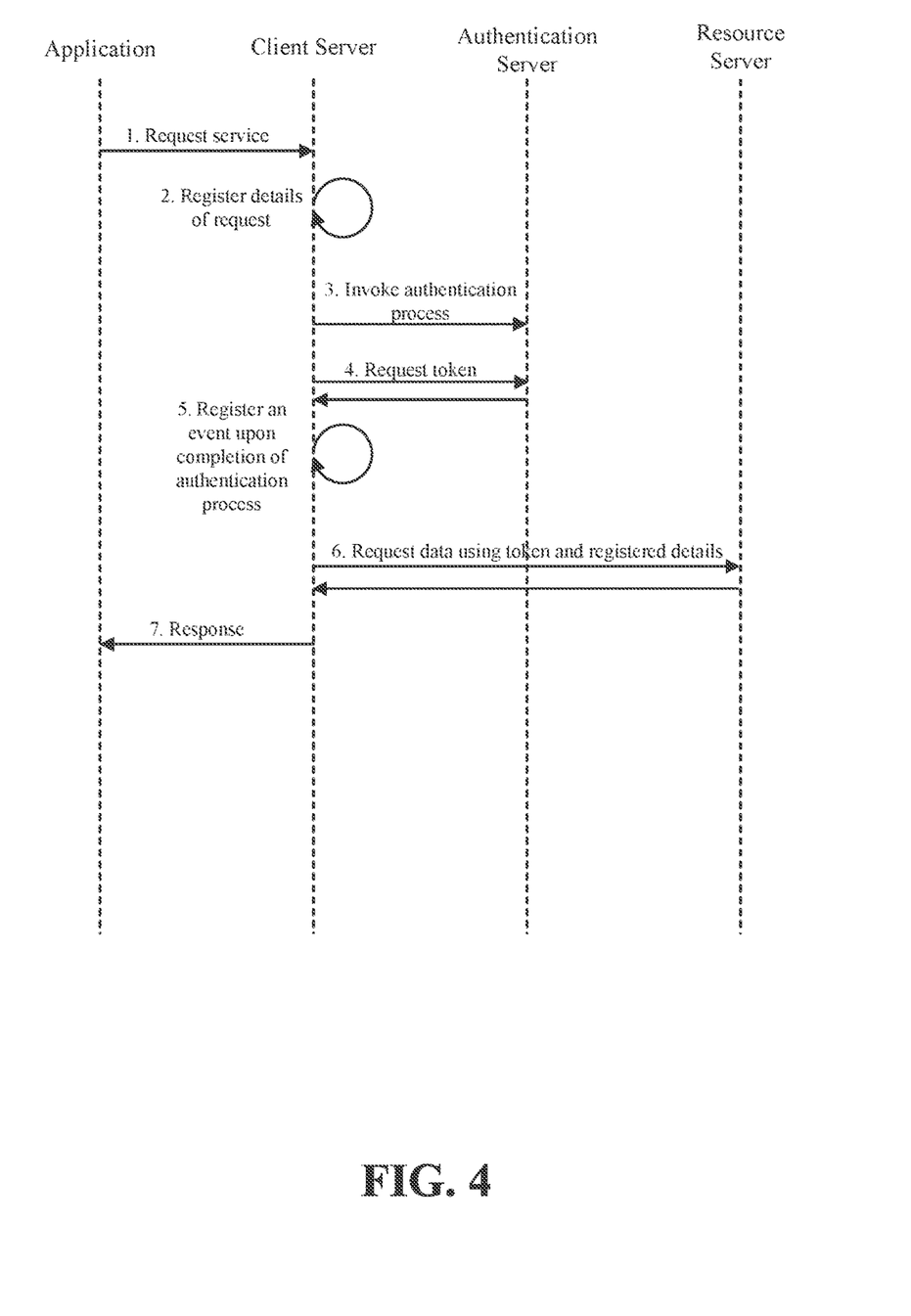
FIG. 4 depicts a flow diagram of an authentication process that, upon completion, allows a client server to request resources from a resource server.

FIG. 4 depicts a flow diagram of an authentication process that, upon completion, allows a client server to request resources from a resource server. The resources can be provided to an application that is executed by a user. The application initially submits a request for service to the client server in response to receiving user input at an application interface presented on a user device. When the application is a hybrid application, the request may be for data maintained by another service or for a process to be performed by another service.

The client server registers details of the request after receiving the request for service from the application. More specifically, an event listener may register a description of the process to be performed, a username, or an identifier (e.g., an organization identifier or an application identifier) that specify where the request originated. The event listener, which is partially or entirely implemented in software, could be programmed in Java. Registration of the details regarding the request completely separates the authentication process from the resource(s) required to satisfy the request for service.

If the client server has not previously been authenticated by the service associated with the resource server, an authentication process is invoked. In some embodiments, the authentication process may require that the client server communicate with a separate server configured for authenticating requesting entities (e.g., servers and applications). Here, for example, the client server submits at least some of the registered information (e.g., the username and identifier) to the authorization server to obtain access to the resource server. Upon authenticating the client server, the authentication server responds by providing an authentication token and/or an address of the resource server. The address may be for an API that provides programmatic access to resources hosted by the resource server.

The event listener registers or "fires" an event when the authentication process has been successfully completed and the client server has been authenticated. Responsive to registering the event, the client server can submit the original request on behalf of the application using at least some of the details registered by the event listener and the authentication token or address received from the authentication server. This mechanism allows the original request to be completed without requiring further user input at the application. That is, the user is not required to provide further user input after submitting the original request, and the application is not required to resubmit the original request. When the request for service is fulfilled by the resource server, an appropriate response can then be passed to the application by the client server.

Figure 5:
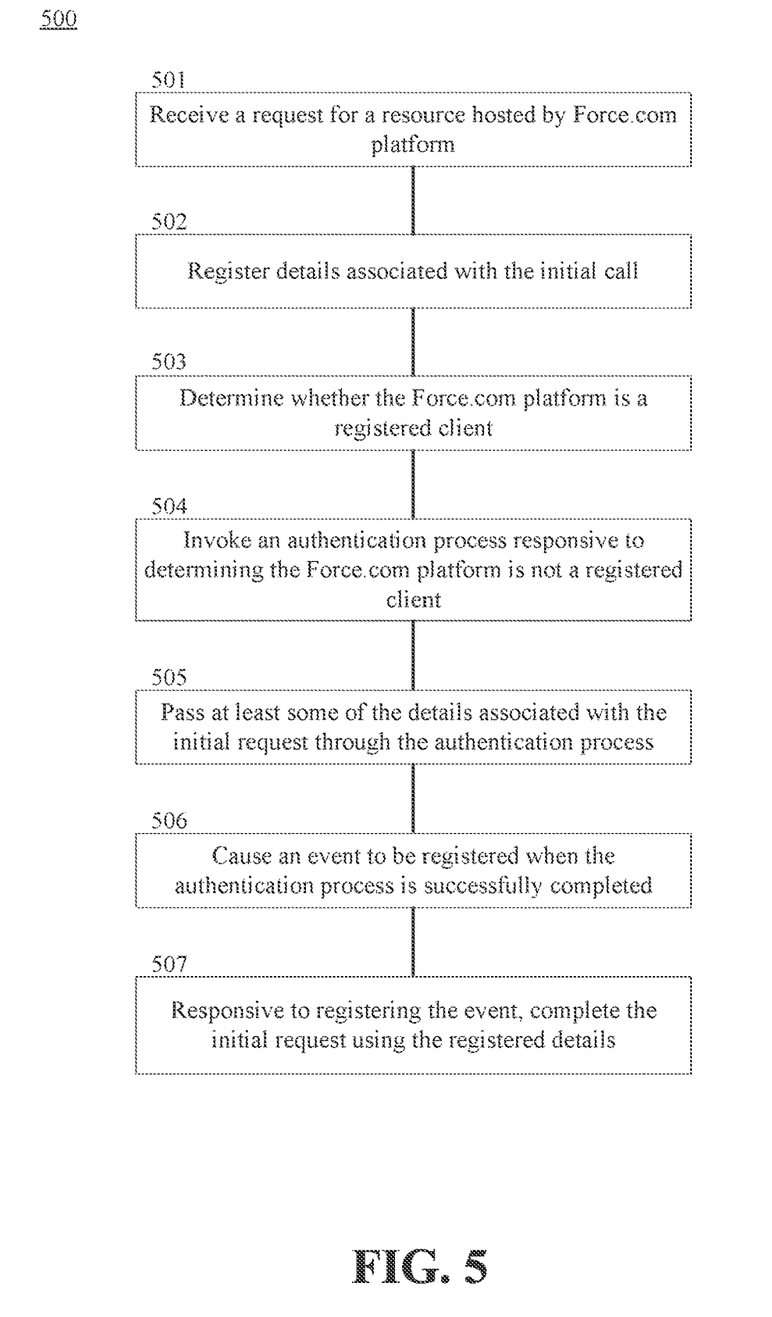
FIG. 5 depicts a process for completing an initial call for a resource (e.g., data or a process) that was made by an application.

FIG. 5 depicts a process 500 for completing an initial call for a resource (e.g., data or a process) that was made by an application. Here, for example, the initial call is submitted to a Heroku platform for a resource that is hosted by a Force.com platform. Although the process 500 is described in the context of an application that is supported by a Heroku platform, the process could also be used with other application development platforms.

A request for service is initially received by the Heroku platform that requires a resource hosted by the Force.com platform (step 501). The request is placed by a hybrid application that spans multiple platforms (here, the Heroku platform and the Force.com platform). Generally, the request is placed by the hybrid application responsive to receiving user input at a user interface presented on a user device. The user interface may be accessed using any appropriate network-accessible user device, such as a mobile phone, tablet, personal computer, game console (e.g., Sony Play Station or Microsoft Xbox), music player (e.g., Apple iPod Touch), wearable electronic device (e.g., a watch or fitness band), network-connected ("smart") device (e.g., television), virtual/augmented reality system (e.g., Oculus Rift or Microsoft Hololens), or some other electronic device.

The Heroku platform can then register details associated with the initial request (step 502). More specifically, an event listener (e.g., a software module programmed in Java) could analyze the initial request and register certain parameters that may be derived from the initial call. For example, the event listener could parse initial call parameters and store information learned from said parsing. The information could include a description of the required resource, a username, or an identifier that specifies where the request originated.

The Heroku platform then determines whether the Force.com platform is a registered client of the Heroku platform (step 503). That is, the Heroku platform determines whether it or the Force.com platform has validated the other. Responsive to determining the Force.com platform is not a registered client, an authentication process is invoked (step 504) and at least some of the details associated with the initial request are passed through the authentication process (step 505). For example, the Heroku platform could pass the username and the identifier to the authentication process for validation (e.g., by the Force.com platform).

When the authentication process is successfully completed, the event listener of the Heroku platform registers or "fires" an event (step 506). The Force.com platform may provide the Heroku platform an authentication token and/or an address to which subsequent calls should be addressed upon successful completion of the authentication process. Because the details were previously registered by the event listener, the initial request and the authentication process are considered to be independent from one another. After the event has been registered by the event listener, the Heroku platform resubmits the initial request on behalf of the application. More specifically, the Heroku platform completes the request using at least some of the registered details (e.g., the description of the required resource) and the authentication token and/or address supplied by the Force.com platform (step 507). Thus, the initial request can be completed by the Heroku platform without requiring further user input at the application.

Unless contrary to physical possibility, it is envisioned that the steps described above may be performed in various sequences and combinations. For instance, the Heroku platform may determine whether the Force.com platform is a registered client before registering details regarding the initial request submitted by the application. Additional steps could also be included in some embodiments. For example, the registered details could be stored within a database before or after placing a call for service to the Force.com platform.

Processing System

Figure 6:
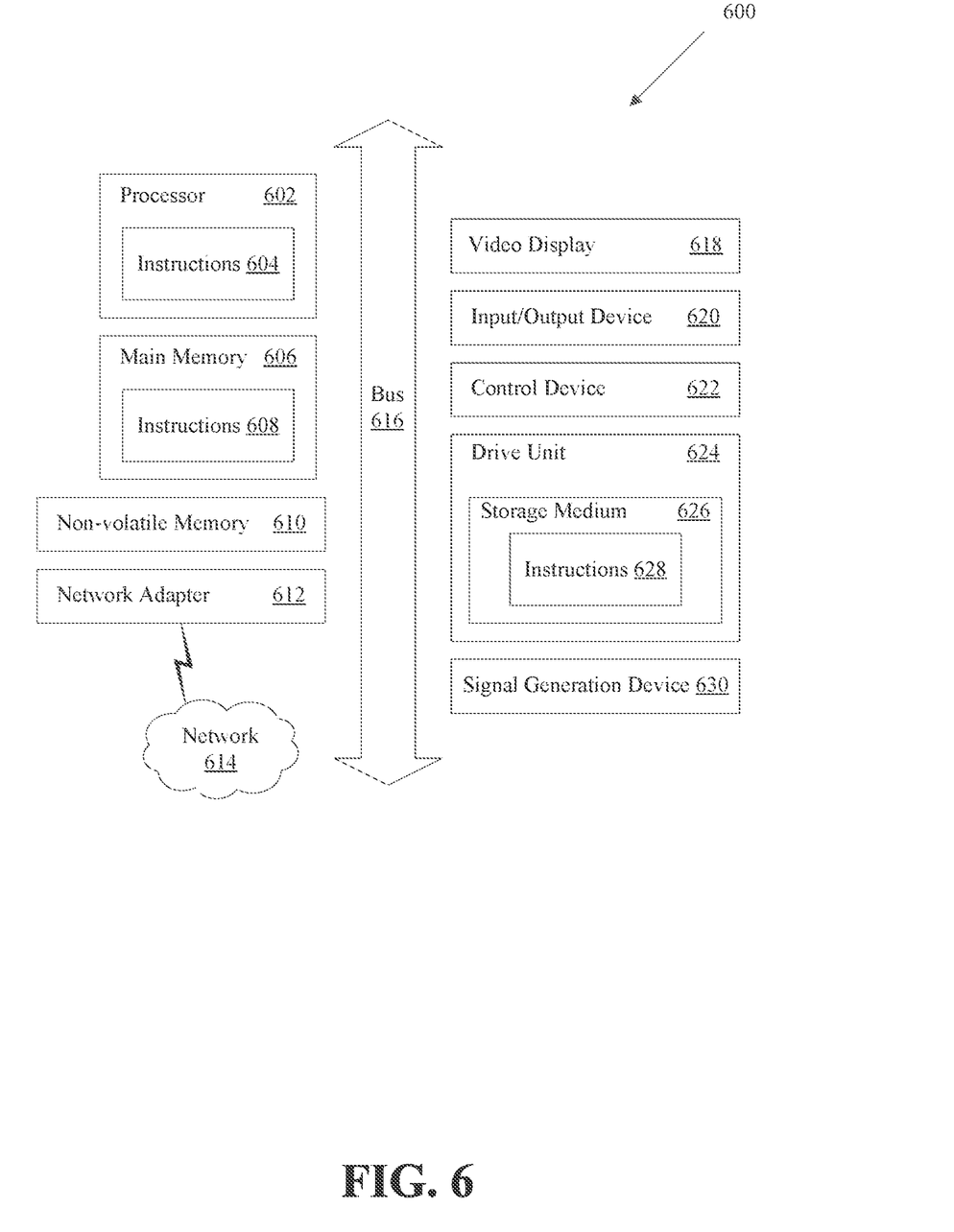
FIG. 6 is a block diagram illustrating an example of a processing system in which at least some operations described herein can be implemented.

FIG. 6 is a block diagram illustrating an example of a processing system 600 in which at least some operations described herein can be implemented. The computing system may include one or more central processing units ("processors") 602, main memory 606, non-volatile memory 610, network adapter 612 (e.g., network interfaces), video display 618, input/output devices 620, control device 622 (e.g., keyboard and pointing devices), drive unit 624 including a storage medium 626, and signal generation device 630 that are communicatively connected to a bus 616. The bus 616 is illustrated as an abstraction that represents any one or more separate physical buses, point to point connections, or both connected by appropriate bridges, adapters, or controllers. The bus 616, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processing system 600 may operate as part of an application development platform or a user device that is used to execute an application that is supported by one or more application development platforms (e.g., Heroku or Force.com). Alternatively, the processing system 600 could be connected (e.g., wired or wirelessly) to the application development platform and/or the user device. In a networked deployment, the processing system 600 may operate in the capacity of a server or a client machine in a client-server network environment, or as a peer machine in a peer-to-peer (or distributed) network environment.

The processing system 600 may be a server computer, a client computer, a personal computer (PC), a tablet PC, a laptop computer, a personal digital assistant (PDA), a mobile telephone, an iPhone®, an iPad®, a Blackberry®, a processor, a telephone, a web appliance, a network router, switch or bridge, a console, a hand-held console, a gaming device, a music player, or any portable, device or any machine capable of executing a set of instructions (sequential or otherwise) that specify actions to be taken by the processing system 600.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 628. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 604, 608, 628) set at various times in various memory and storage devices in a computer, and that, when read and executed by one or more processing units or processors 602, cause the processing system 600 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 610, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 612 enables the processing system 600 to mediate data in a network 614 with an entity that is external to the processing system 600 through any known and/or convenient communications protocol supported by the processing system 600 and the external entity. The network adapter 612 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 612 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method comprising:
    receiving, at an application development platform, an initial call from an application for a resource that is hosted by an external service;
    registering details regarding the initial call using an event listener;

determining whether the external service is a registered client of the application development platform;
responsive to determining the external service is not a registered client, invoking an authentication process; and
passing at least some of the details regarding the initial call through the authentication process;
causing the event listener to register an event when the authentication process is successfully completed; and
responsive to the event listener registering the event, completing the initial call for the resource using the details registered by the event listener.

2. The method of claim 1, wherein the event listener is programmed in Java.

3. The method of claim 1, wherein the external service is a Force.com platform, and wherein the authentication process is an OAuth 2.0 web server authentication process facilitated by the Force.com platform.

4. The method of claim 1, wherein the resource includes data hosted by the external service or a process to be executed by the external service.

5. The method of claim 1, wherein the details include a description of the resource, a username, and an identifier that identifies the application where the initial call originated.

6. The method of claim 5, wherein the at least some details passed through the authentication process include the username, the identifier, or both.

7. The method of claim 1, further comprising:
receiving, from the external service, an address of an application programming interface (API) to be used by the application development platform for making subsequent calls to the external service.

8. The method of claim 7, wherein the API is used by the application development platform to gain programmatic access to processes and data associated with the external service.

9. The method of claim 7, wherein the subsequent calls by the application development platform are made directly to the API of the external service.

10. A network-accessible platform for developing applications, the platform comprising:
a processor; and
a memory that includes instruction that, when executed by the processor, cause the processor to:
receive a Hypertext Transfer Protocol (HTTP) call from an application for a resource that is hosted by a Force.com platform;
register details regarding the HTTP call within the memory using an event listener;
determining whether the Force.com platform is a registered client of the network-accessible platform;
responsive to determining the Force.com platform is not a registered client, invoke an authentication mechanism; and
pass at least some of the details regarding the initial call to the authentication mechanism;
continuously monitor whether the event listener has registered an event in response to successful authentication by the authentication mechanism; and
responsive to determining the event listener has registered the event,
retrieve the details associated with the HTTP call from within the memory; and
complete the HTTP call for the resource using the details without requiring further user input at the application.

11. The network-accessible platform of claim 10, wherein the instructions further cause the processor to:
receive, from the Force.com platform, an address to an application programming interface (API) upon successful authentication by the authentication mechanism,
where the API provides programmatic access to processes and data associated with the Force.com platform.

12. The network-accessible platform of 10, wherein the resource includes data hosted by the Force.com platform or a process to be executed by the Force.com platform.

13. The network-accessible platform of claim 10, wherein the authentication mechanism is an OAuth 2.0 web server authentication process facilitated by the Force.com platform.

* * * * *